United States Patent
Lee (10) Patent No.: US 9,829,322 B2
(45) Date of Patent: Nov. 28, 2017

(54) SYSTEMS AND METHODS FOR DIRECTING A VISION-IMPAIRED USER TO A VEHICLE

(71) Applicant: Toyota Motor Engineering & Manufacturing North America, Inc., Erlanger, KY (US)

(72) Inventor: Christopher P. Lee, Campbell, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 117 days.

(21) Appl. No.: 15/060,015

(22) Filed: Mar. 3, 2016

(65) Prior Publication Data

US 2017/0254646 A1    Sep. 7, 2017

(51) Int. Cl.
| G01C 21/34 | (2006.01) |
| G01C 21/00 | (2006.01) |
| H04W 4/02 | (2009.01) |
| H04W 64/00 | (2009.01) |

(52) U.S. Cl.
CPC ............. *G01C 21/00* (2013.01); *G01C 21/34* (2013.01); *H04W 4/02* (2013.01); *H04W 64/00* (2013.01)

(58) Field of Classification Search
CPC ....... G01C 21/00; G01C 21/34; H04W 64/00; H04W 4/02
See application file for complete search history.

(56) References Cited

U.S. PATENT DOCUMENTS

| 4,215,490 A | 8/1980 | Fewell |
| 5,047,952 A | 9/1991 | Kramer et al. |

(Continued)

FOREIGN PATENT DOCUMENTS

| CN | 201036605 | 3/2008 |
| CN | 201251445 | 6/2009 |

(Continued)

OTHER PUBLICATIONS

Shapina et al., "Mobility recognition system for the visually impaired," Year: 2014, pp. 362-367.*

(Continued)

*Primary Examiner* — Tuan C. To
(74) *Attorney, Agent, or Firm* — Dinsmore & Shohl LLP (57) ABSTRACT

Systems and methods for directing a vision-impaired user to a vehicle are disclosed. One embodiment of a system includes a vision-assist apparatus that includes an output device for communicating data that is perceptible by a vision-impaired user and a computing device that is coupled to the output device. The computing device may include a processor and memory that stores logic that, when executed by the processor, causes the vision-assist apparatus to receive an indication that the vehicle has arrived at a predetermined location, receive, from the vehicle computing device, a specific real-time position of the vehicle in the predetermined location, and determine a route to direct the vision-impaired user to the specific real-time position. In some embodiments, the logic further causes the vision-assist apparatus to provide instructions to traverse the route to the specific real-time position for output by the output device.

20 Claims, 6 Drawing Sheets

(56) References Cited

U.S. PATENT DOCUMENTS

| | | | | |
|---|---|---|---|---|
| 5,806,017 A | * | 9/1998 | Hancock | G01C 21/20 701/428 |
| 6,292,743 B1 | * | 9/2001 | Pu | G01C 21/26 455/456.6 |
| 7,446,669 B2 | | 11/2008 | Liebermann | |
| 7,864,991 B2 | | 1/2011 | Espenlaub et al. | |
| 8,606,316 B2 | | 12/2013 | Evanitsky | |
| 9,111,545 B2 | | 8/2015 | Jadhav et al. | |
| 9,146,112 B2 | * | 9/2015 | Friedlander | G01C 21/00 |
| 9,726,746 B2 | * | 8/2017 | Said | G01S 1/08 |
| 2004/0054428 A1 | * | 3/2004 | Sheha | G01C 21/3664 700/56 |
| 2007/0010940 A1 | * | 1/2007 | Tan | G01C 21/20 701/469 |
| 2007/0018890 A1 | | 1/2007 | Kulyukin | |
| 2007/0294024 A1 | * | 12/2007 | Sasaki | G01C 21/3415 701/532 |
| 2008/0109158 A1 | * | 5/2008 | Huhtala | A63B 24/0062 701/439 |
| 2010/0205022 A1 | * | 8/2010 | Brown | G06Q 10/047 705/7.11 |
| 2010/0263603 A1 | | 10/2010 | Baron | |
| 2011/0307172 A1 | | 12/2011 | Jadhav et al. | |
| 2012/0278736 A1 | * | 11/2012 | Tran | H04N 21/252 715/753 |
| 2014/0062790 A1 | * | 3/2014 | Letz | H04L 67/1095 342/386 |
| 2014/0248908 A1 | * | 9/2014 | Etchegoyen | B60G 11/27 455/456.2 |
| 2014/0266571 A1 | | 9/2014 | Sharma et al. | |
| 2016/0063893 A1 | * | 3/2016 | Kanuganti | G09B 21/001 348/62 |

FOREIGN PATENT DOCUMENTS

| | | | | |
|---|---|---|---|---|
| CN | 103226018 | | 7/2013 | |
| CN | 103413456 | | 11/2013 | |
| CN | 203619858 | | 6/2014 | |
| DE | 102009047696 A1 | * | 6/2011 | G01C 21/362 |
| KR | 2015088056 | | 7/2015 | |
| WO | 2008015375 | | 2/2008 | |

OTHER PUBLICATIONS

Chun-Hung et al., "The design and evaluation of an auditory navigation system for blind and visually impaired," Year: 2014, pp. 342-345.*

Kishor Vijay Patil; "A Review on Voice Based Passenger Bus Predicting Arrival of Bus for Easy Navigation of Blind"; URL: http://www.ijmetmr.com/olseptember2015/KishorVijayPatil-A-43; Publication: International Journal & Magazine of Engineering, Technology, Management and Research, Sep. 2015, pp. 1384-1390, vol. No. 2, Issue No. 9.

http://www.humanware.com/en-usa/products/deafblind_communication_solutions/deafblind_communicator, Deaf Blind Communicator; 3 pages, accessed Jan. 4, 2016.

U.S. Appl. No. 15/052,495, filed Feb. 24, 2016, not yet published.

* cited by examiner

SYSTEMS AND METHODS FOR DIRECTING A VISION-IMPAIRED USER TO A VEHICLE

TECHNICAL FIELD

Embodiments described herein generally relate to systems and methods for directing a vision-impaired user to a vehicle and, more specifically, to embodiments for correlating a vision-assist apparatus with a vehicle, such as a taxi, bus, and the like.

BACKGROUND

When visually-impaired persons attempt to acquire and board a vehicle, such as a bus, a taxi, a ride-sharing service vehicle (such as Uber™, Lyft™, local transportation on-demand services, etc.), and the like, it is often difficult for the visually-impaired person to determine when the correct vehicle arrives and the exact location of the vehicle. While many mobile applications are configured to communicate with unimpaired users regarding the location of a vehicle (such as a vehicle providing a ride-sharing service), these applications are often without benefit for a visually impaired person. As a result, a need exists in the industry.

SUMMARY

Systems and methods for directing a vision-impaired user to a vehicle are disclosed. One embodiment of a system includes a vision-assist apparatus that includes an output device for communicating data that is perceptible by the vision-impaired user and a computing device that is coupled to the output device. The computing device may include a processor and memory that stores logic that, when executed by the processor, causes the vision-assist apparatus to receive an indication that the vehicle has arrived at a predetermined location, receive, from the vehicle computing device, a specific real-time position of the vehicle in the predetermined location, and determine a route to direct the vision-impaired user to the specific real-time position. In some embodiments, the logic further causes the vision-assist apparatus to provide instructions to traverse the route to the specific real-time position for output by the output device.

In another embodiment, a method includes receiving a request for the vehicle to arrive at a predetermined location, where the vehicle includes a vehicle computing device. Some embodiments include receiving an indication that the vehicle has arrived at the predetermined location, receiving a specific real-time position of the vehicle in the predetermined location, and determining a route to direct the vision-impaired user to the specific real-time position. Similarly, some embodiments include determining an obstacle along the route, creating a revised route to avoid the obstacle, and providing instructions to traverse the revised route to the specific real-time position.

In yet another embodiment, a system includes an output device for communicating data that is perceptible by a vision impaired user and a computing device that is coupled to the output device. The computing device may include a processor and memory that stores logic that, when executed by the processor, causes the system to receive an indication that the vehicle has arrived at a predetermined location, receive a specific real-time position of the vehicle in the predetermined location from a vehicle computing device of the vehicle, and determine a route to direct the vision-impaired user to the specific real-time position. In some embodiments, the logic causes the system to provide a first instruction to traverse the route to the specific real-time position for output by the output device, determine a change of position of the vehicle, and provide a second instruction for the vision-impaired user to reach the vehicle, according to the change of position.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for directing a visually-impaired user to a vehicle. Some embodiments may include a vision-assist apparatus that the visually impaired user may wear or otherwise utilize for navigating, responding and/or interacting in an environment. The vision-assist apparatus may include a necklace, a headset, a handheld device, etc. that the user wears or otherwise utilizes. The vision-assist apparatus may be configured to provide the visually-impaired user with audio and/or tactile feedback regarding the environment.

Accordingly, embodiments described herein may be configured as a system or method for communicating vehicle location data to a user of a vision-assist apparatus. In some embodiments, the vision-assist apparatus may include logic (hardware, software, firmware, etc.) that communicates with a smart phone or other mobile computing device to indicate when a bus, ride-sharing service vehicle, taxi, friend, or other vehicle has arrived to pick up the user. The vision-assist apparatus may then provide directions and/or other instruction for the user to reach and/or enter the vehicle. These instructions may be provided via an output device, such as an audio and/or tactile output device of the vision-assist apparatus and may include indicating a location of a door handle, a step, and/or other instructions to safely guide the user into a seat of the vehicle.

Similarly, some embodiments include logic for communicating with the vehicle to determine the current location of the vehicle, the type of vehicle, a time of arrival, an expected location of the vehicle when the vehicle arrives, an expected orientation of the vehicle when the vehicle arrives, and/or other information. Depending on the embodiment, the vehicle may communicate some or all of this data to the smart phone and/or to the vision-assist apparatus. Similarly, the vehicle computing device, mobile computing device, and/or the vision-assist apparatus may determine the instructions that are provided to the user. Based on the user's actions or additional vehicle movements, the instructions may change to properly instruct the user into the vehicle. The systems and methods for directing a user to a vehicle incorporating the same will be described in more detail, below.

Figure 1:
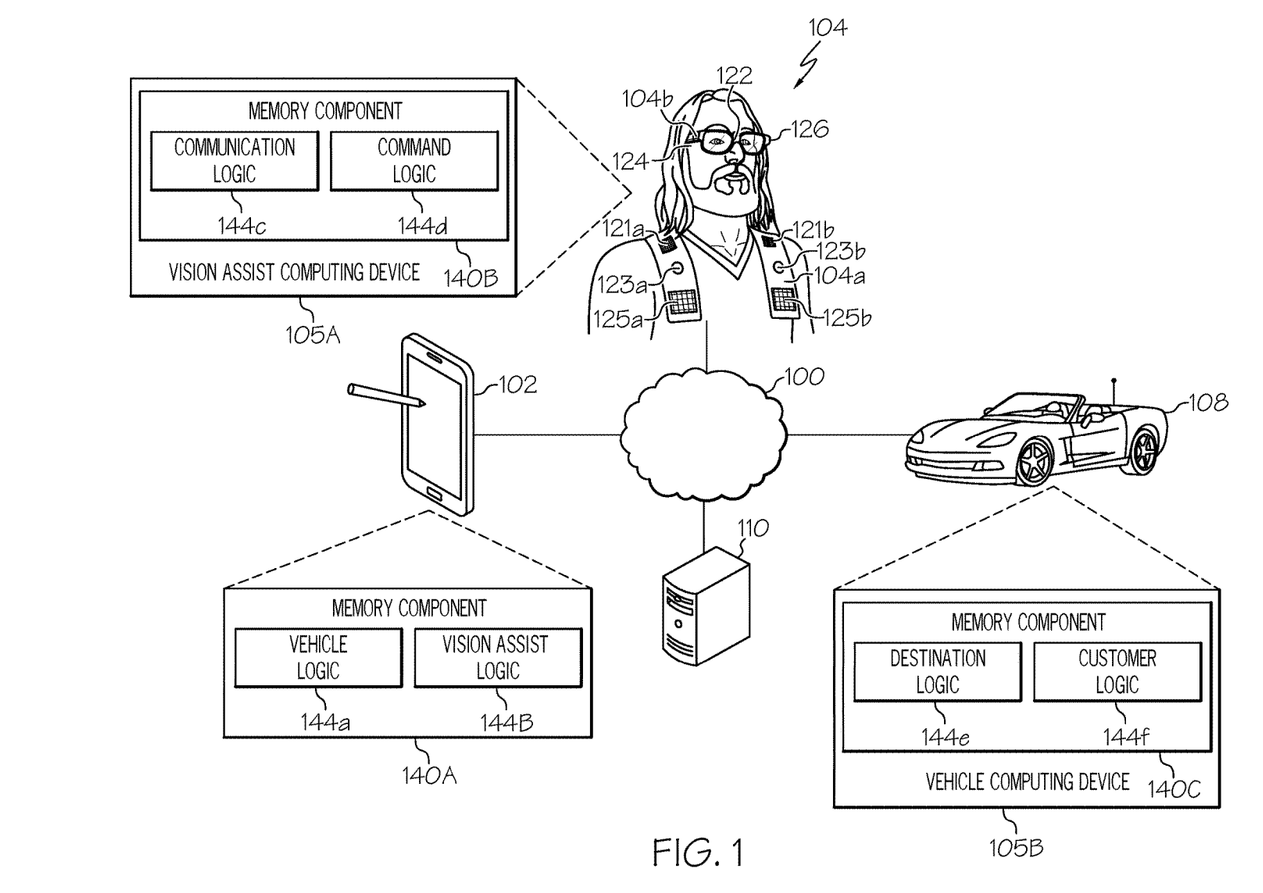
FIG. 1 depicts a computing environment for directing a user to a vehicle, according to embodiments described herein.

Referring now to the drawings, FIG. 1 depicts a computing environment for directing a user to a vehicle 108, according to embodiments described herein. As illustrated, the computing environment includes a network 100 that is coupled to a user computing device 102, a vision-assist apparatus 104, a vehicle 108, and a remote computing device 110. The network 100 may include a wide area network, such as the internet, a public switched telephone network, a cellular network, and the like. Similarly, the network 100 may include a local area network, such as a wireless fidelity network, an Ethernet, a Bluetooth™ network, a Zigbee™ network, and the like.

Coupled to the network 100 is the user computing device 102, which may include a memory component 140a that stores vehicle logic 144a and vision-assist logic 144b. As described in more detail below, the vehicle logic 144a may cause the user computing device 102 to receive global positioning data and/or other data related to the location of a vehicle 108, such as a bus, taxi, ride-sharing service vehicle, friend, and the like. The vision-assist logic 144b may be configured as a mobile application and may cause the user computing device 102 to communicate with the vision-assist apparatus 104 to provide location data, user preferences, etc. for the vision-assist apparatus 104. The communication between the user computing device 102 and the vision-assist apparatus 104 my include data related to directions, destinations, instructions, and/or commands that may be provided by the vision-assist apparatus 104 to the user.

The vision-assist apparatus 104 may include a vision-assist computing device 105a and a memory component 140b for communicating with user computing device 102 and/or the vehicle computing device 105b. The vision-assist apparatus 104 may include a necklace module 104a and/or an eyeglass module 104b. The eyeglass module 104b may include at least one camera 122 (such as an eye tracking camera and/or environment camera), at least one speaker 124, and/or at least one tactile output device 126. Similarly, the necklace module 104a may include at least one camera 121a, 121b (such as an eye tracking camera and/or an environment camera), at least one speaker 123a, 123b, and/or at least one tactile output device 125a, 125b. The vision-assist apparatus 104 may also include one or more inertial measurement units, tactile input hardware, one or more microphones, one or more tactile feedback devices, one or more location sensors, one or more lights, one or more proximity sensors, one or more batteries, one or more charging ports, global positioning hardware, and/or other hardware and software.

It should also be understood that while the vision-assist apparatus 104 is depicted in FIG. 1 as including the eyeglass module 104b and/or the necklace module 104a, this is just an example. Some embodiments may be configured as a bracelet, handheld device, clothing, headset, etc. It will also be understood that embodiments may be configured to facilitate communication among the bracelet, handheld device, clothing, headset, etc. for facilitating the functionality described herein.

Also included with the vision-assist apparatus 104 is a vision-assist computing device 105a. The vision-assist computing device 105a may include a memory component 140b, which stores communication logic 144c and command logic 144d. The communication logic 144c may cause the vision-assist apparatus 104 to communicate with the user computing device 102, the vehicle computing device 105b, and/or the remote computing device 110 to request instructions and/or receive instructions related to an environment or destination. The command logic 144d may cause the vision-assist apparatus 104 to provide audible and/or tactile instructions to the user for reaching the vehicle 108. These and other hardware and software components are described in more detail below.

As discussed above, the vehicle 108 may include a vehicle computing device 105b, which includes a memory component 140c. The memory component 140c may store destination logic 144e and customer logic 144f The destination logic 144e may be configured to cause the vehicle computing device 105b to determine a destination, as well as a route for reaching the destination. The customer logic 144f may cause the vehicle computing device 105b to communicate with the user computing device 102, the vision-assist apparatus 104, and/or the remote computing device 110 to direct the user to the vehicle 108.

Also coupled to the network 100 is the remote computing device 110. The remote computing device 110 may be configured as a vehicle coordination computing device that pairs the user with the vehicle 108. Similarly, some embodiments may include the remote computing device 110 as a web server for providing location data regarding the vehicle 108. In some embodiments, the remote computing device 110 may be configured as routing and/or positioning server for communicating route data to the vehicle computing device 105b, the user computing device 102, and/or the vision-assist apparatus 104.

Figure 2A:
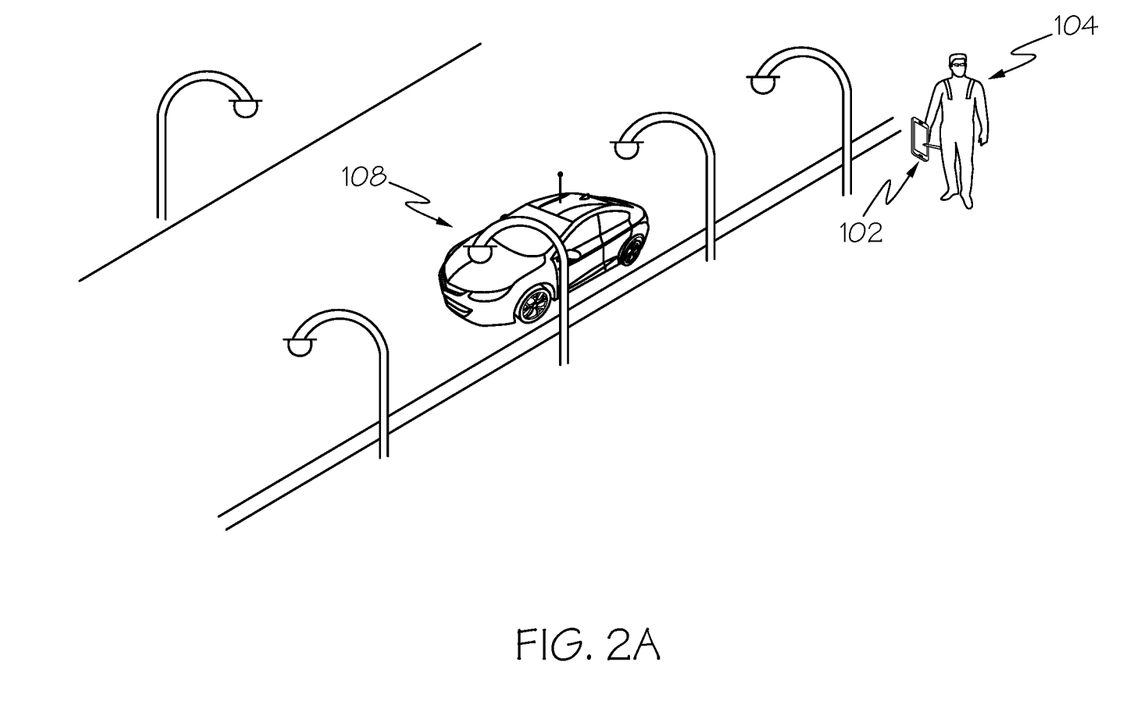
FIG. 2A-2B depict areas between which a user may be directed to a vehicle, according to embodiments described herein.
Figure 2B:
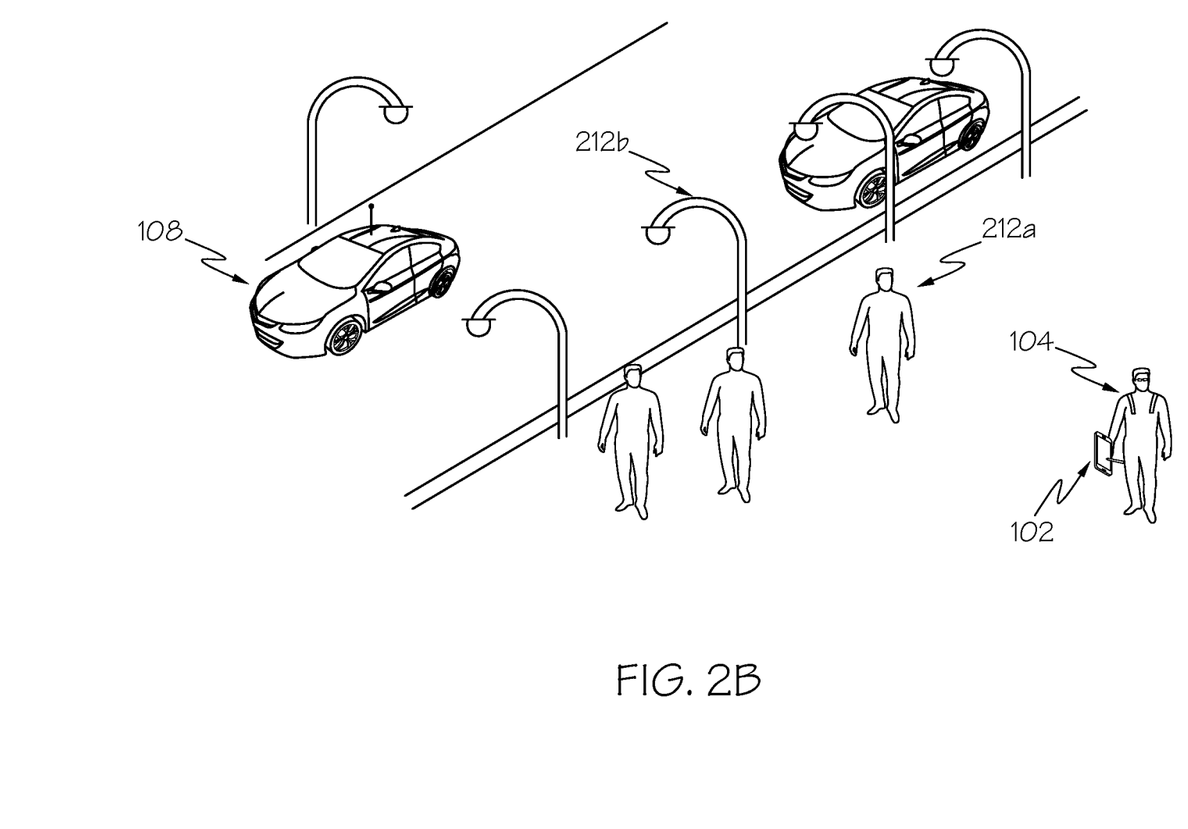

FIG. 2A-2B depict areas between which a user may be directed to a vehicle 108, according to embodiments described herein. While the bus may be on a predetermined schedule, the user may utilize the vision-assist apparatus 104 and/or user computing device 102 to schedule the taxi, ride-sharing service vehicle, and/or friend for picking up the user at a predetermined location.

As an example, the user may provide input to the vision-assist apparatus 104 for scheduling a vehicle 108. The input may take the form of a voice command, tactile input, etc. Depending on the embodiment, the vision-assist apparatus 104 may directly communicate with the remote computing device 110 and/or cause the user computing device 102 to communicate with the remote computing device 110 to schedule the vehicle 108. Regardless, upon scheduling the vehicle 108 with the remote computing device 110, the remote computing device 110 may communicate the schedule to the vehicle computing device 105b. The driver of the vehicle 108 may confirm the schedule via the vehicle computing device 105b, which is then relayed back to the vision-assist apparatus 104 and/or user computing device 102.

In the confirmation, the vehicle computing device 105b may communicate the current location of the vehicle 108, the expected time of arrival to the predetermined location, and/or other information related to a time and place for meeting the user. In some embodiments, this information may be provided to the vision-assist apparatus 104 via the remote computing device 110. However, upon arrival at the general vicinity of the predetermined location, the vehicle computing device 105b may be configured to communicate with the vision-assist apparatus 104 and/or the user computing device 102 directly.

Referring now to FIG. 2A, as the vehicle 108 arrives at the predetermined location, the vehicle computing device 105b may communicate a real-time position of the vehicle 108 in the predetermined location to the vision-assist apparatus 104 and/or user computing device 102. In some embodiments, the vision-assist apparatus 104 and/or the user computing device 102 may communicate the current location of the user to the vehicle computing device 105b so that the driver may determine the location of the user.

Additionally, the vision-assist apparatus 104 may provide the user with a first instruction, which may include one or more audible and/or tactile commands for reaching the vehicle 108. As such the commands may include directions, environmental factors, and/or the respective location of the vehicle 108 with regard to the user's changing position. Because the vision-assist apparatus 104 includes one or more cameras 121a, 121b, 122, the vision-assist apparatus 104 may provide additional information and/or commands such as information related to the location of uneven footing, stairs, a door handle location of the vehicle 108, an indication that the door of the vehicle 108 is open, and the like.

It should be understood that while some embodiments of the vision-assist apparatus 104 may be configured to communicate with the vehicle computing device 105b and the remote computing device 110 directly, some embodiments may utilize the user computing device 102. Depending on the particular embodiment, the user computing device 102 may supplement the data received by the vision-assist apparatus 104 (such as by providing routing functionality) and/or may serve as the conduit between the vision-assist apparatus 104 and the other computing devices.

It should also be understood that when the user is attempting to board a bus, subway, train, or other vehicle that operates on a predetermined schedule, similar functionality may be provided. As an example, the bus may arrive at a destination and the vehicle computing device 105b may communicate with the vision-assist apparatus 104 and/or user computing device 102 to identify a position of the bus, as well as an entrance to the bus. The vision-assist apparatus 104 and/or user computing device 102 may additionally communicate a position and/or other data regarding the user (including payment information in some embodiments), such that the bus may wait and/or otherwise accommodate for the user.

Accordingly, FIG. 2B depicts an environment with changing conditions. Specifically, the example of FIG. 2A illustrates that the vision-assist apparatus 104 may direct the user to the vehicle 108. In FIG. 2B, the vehicle 108 may be required to move prior to the user reaching the vehicle 108 and/or other unexpected obstacles may require an amendment of the directions provided by the vision-assist apparatus 104. In some embodiments, the vehicle 108 may communicate arrival to the predetermined destination to the vision-assist apparatus 104 and may then move. As a result, the vision-assist apparatus 104 and/or the user computing device 102 may have already calculated a route for the user to take to reach the vehicle 108. Thus, a second instruction may be provided to the user to reach the changed position.

When the vehicle 108 moves, the vehicle computing device 105b may communicate with the vision-assist apparatus 104 and/or the user computing device 102 to indicate a new position. The vehicle computing device 105b may determine the new position, based on the route and the current position of the user to make it easier for the user to reach the vehicle 108. In some embodiments, the vehicle computing device 105b may send data to the vision-assist apparatus 104 and/or the user computing device 102 to instruct the user to stop proceeding until a new position can be established. Similarly, some embodiments of the vehicle 108 may simply communicate the new position to the vision-assist apparatus 104 and/or the user computing device 102, even if the vehicle 108 has not yet arrived at the new position. As such, expected arrival times to a real-time position may be calculated for the vehicle 108 and/or user to ensure that the vehicle arrives at the real-time position prior to the user.

Some embodiments may calculate a route to the vehicle 108 and, based on visual and/or other input received by the vision-assist apparatus 104, the route may be altered to create a revised route to avoid previously unexpected obstacles. As illustrated in FIG. 2B, obstacles 212a, 212b may be identified as interfering with the route to the vehicle 108. As an example, a stationary obstacle 212b may be detected relative to the vision-impaired user. A moving obstacle 212a may also be detected, and a prediction may be made regarding the path of the moving obstacle 212a and an action for the vision impaired user to avoid the moving obstacle 212a. As a result, the vision-assist apparatus 104 may identify the obstacles 212a, 212b and alter the route and/or instructions provided to the user to avoid those obstacles 212a, 212b and reach the vehicle 108. Additionally, the vision-assist apparatus 104 may determine that the vision-impaired user cannot reach route to the vehicle 108 using the route (such as because of traffic, terrain, obstacles, etc.) and may calculate a new route and provide an additional instruction to the user. In some embodiments, a communication may be sent to the vehicle computing device 105b to request a new position for the vehicle 108 that the user can reach.

Figure 3:
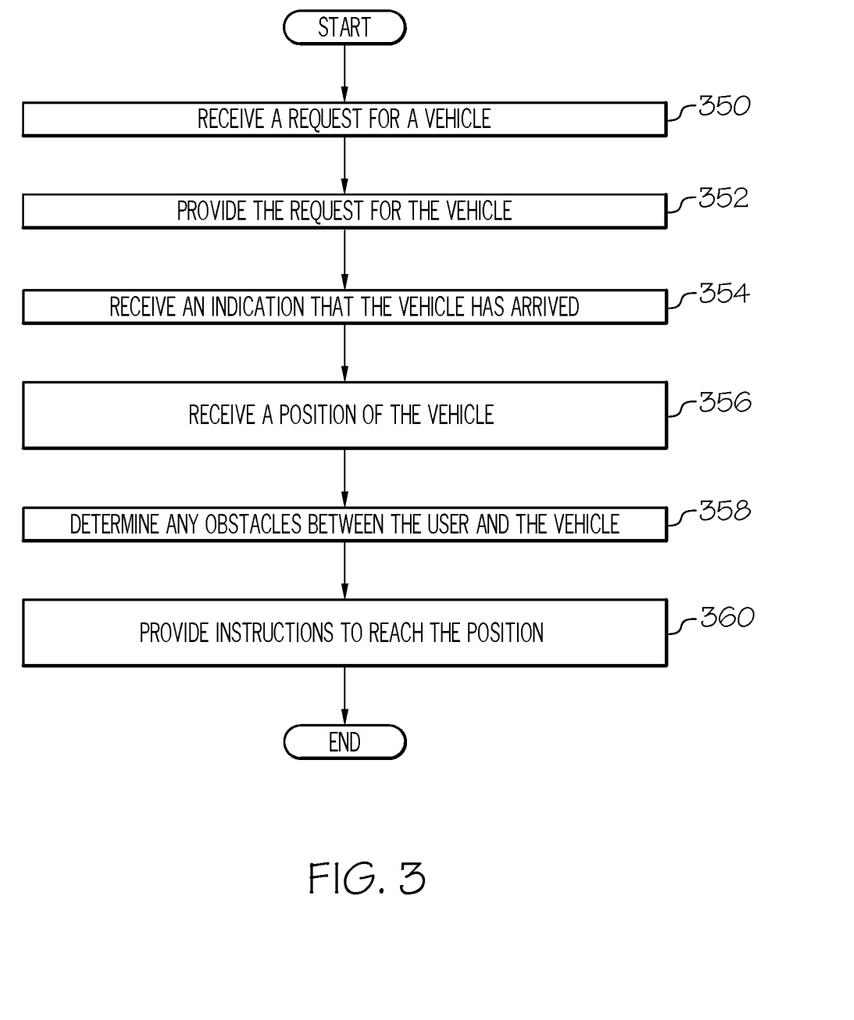
FIG. 3 depicts a flowchart for directing a user to a vehicle, while avoiding obstacles, according to embodiments described herein.

FIG. 3 depicts a flowchart for directing a user to a vehicle 108, while avoiding obstacles 212, according to embodiments described herein. As illustrated in block 350, a request for a vehicle 108 may be received. As discussed above, the request may be received by the vision-assist apparatus 104 and/or user computing device 102, which may also determine a location and/or destination for the user. In block 352, the request for the vehicle 108 may be provided to the remote computing device 110. In block 354, an indication that the vehicle 108 has arrived may be provided. Depending on the embodiment, this indication may be provided by the vehicle computing device 105b and/or by the remote computing device 110. Regardless, in block 356, a specific real-time position of the vehicle 108 may be received from the vehicle computing device 105b. In block 358, obstacles 212 between the user and the vehicle 108 may be determined, such as via the camera 121a, 121b, 122 and/or microphone on the vision-assist apparatus 104. In block 360, instructions may be provided to reach the specific real-time position of the vehicle 108 for output by the vision-assist apparatus 104.

Figure 4:
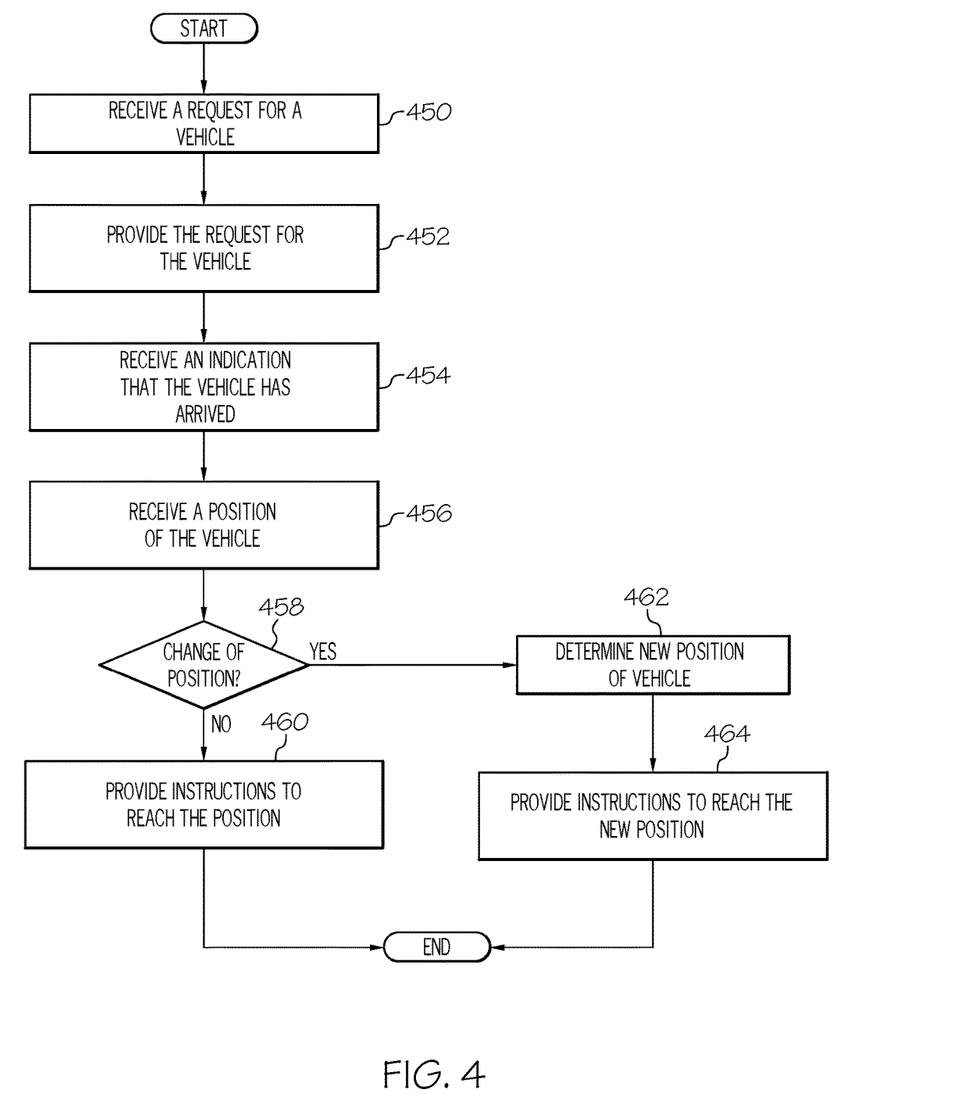
FIG. 4 depicts a flowchart for directing a user to a vehicle that changes positions, according to embodiments described herein.

FIG. 4 depicts a flowchart for directing a user to a vehicle 108 that changes positions, according to embodiments described herein. As illustrated in block 450, a request for a vehicle 108 may be received. In block 452, the request for the vehicle 108 may be sent to the remote computing device 110. In block 454, an indication that the vehicle 108 has arrived at a predetermined location may be provided. As described above, the indication may be sent from the remote computing device 110 and/or the vehicle computing device 105b, depending on the embodiment. In block 456, a specific real-time position of the vehicle 108 may be received from the vehicle computing device 105b. In block 458, a determination may be made regarding whether a change of position of the vehicle 108 has occurred. If the vehicle 108 has not changed position, in block 460, instructions may be provided to reach the specific real-time position of the vehicle 108 for output by the vision-assist apparatus 104.

If at block 458, the vehicle 108 has changed position, at block 462, the new position of the vehicle 108 is determined. In block 464, instructions to reach the new position of the vehicle 108 may be provided for output by the vision-assist apparatus 104.

Figure 5:
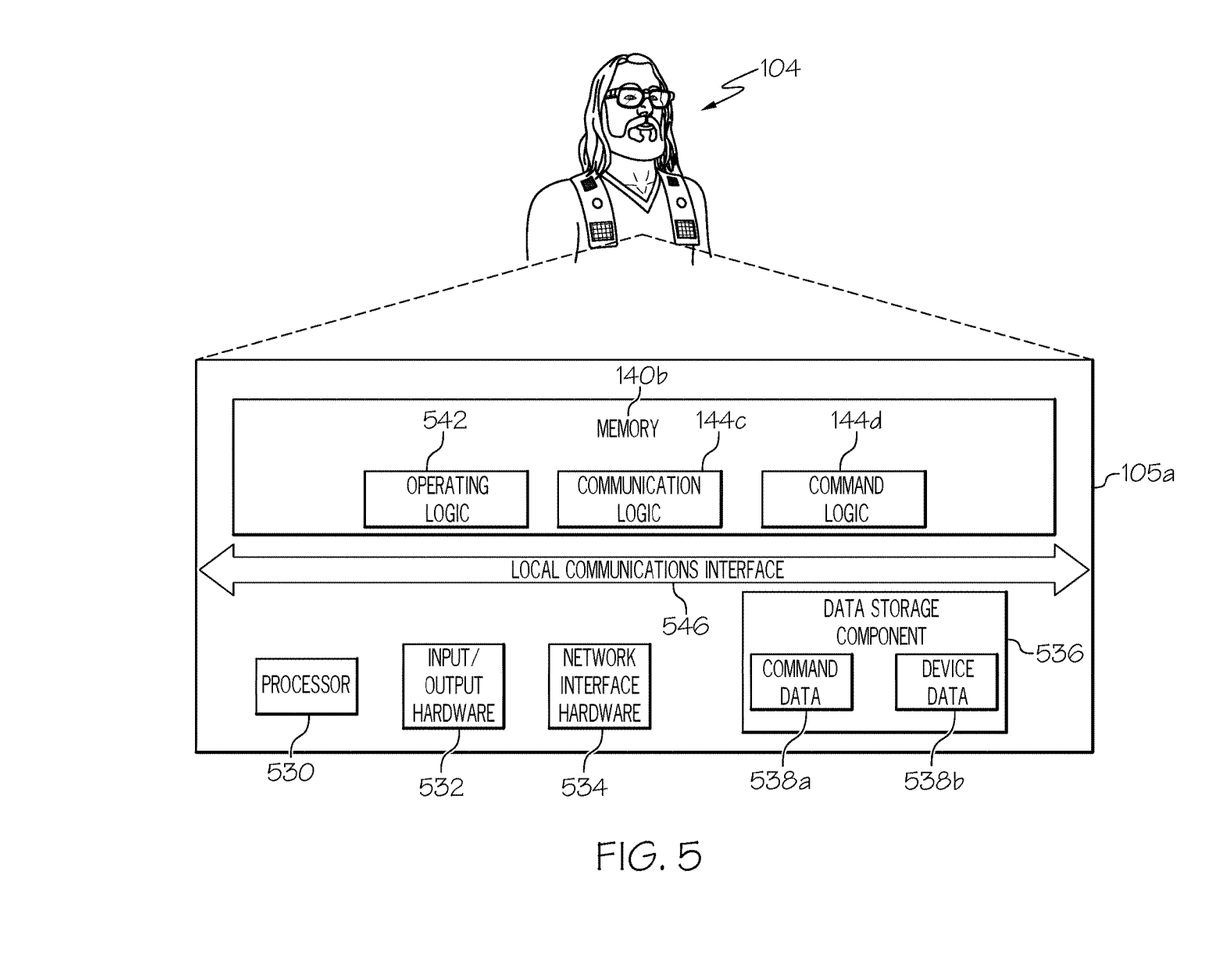
FIG. 5 depicts a vision-assist computing device for directing a user to a vehicle, according to embodiments described herein.

FIG. 5 depicts a vision-assist computing device 105a for directing a user to a vehicle 108, according to embodiments described herein. The vision-assist computing device 105a includes a processor 530, input/output hardware 532, network interface hardware 534, a data storage component 536 (which stores command data 538a, device data 538b, and/or other data), and the memory component 140b. The memory component 140b may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vision-assist computing device 105a and/or external to the vision-assist computing device 105a.

The memory component 140b may store operating system logic 542, the communication logic 144c and the command logic 144d. The communication logic 144c and the command logic 144d may each include a plurality of different pieces of logic, each of which may be embodied as a computer program, firmware, and/or hardware, as an example. A local communications interface 546 is also included in FIG. 5 and may be implemented as a bus or other communication interface to facilitate communication among the components of the vision-assist computing device 105a.

The processor 530 may include any processing component operable to receive and execute instructions (such as from a data storage component 536 and/or the memory component 140b). As described above, the input/output hardware 532 may include and/or be configured to interface with the components of FIG. 1 including the cameras 121a, 121b, 122, speakers 123a, 123b, 124, tactile output devices 125a, 125b, 126, one or more inertial measurement units, tactile input hardware, one or more microphones, one or more tactile feedback devices, one or more location sensors, one or more lights, one or more proximity sensors, one or more batteries, one or more charging ports, global positioning hardware, which may be included with the vision-assist apparatus 104.

The network interface hardware 534 may include and/or be configured for communicating with any wired or wireless networking hardware, including an antenna, a modem, a LAN port, wireless fidelity (Wi-Fi) card, WiMax card, Bluetooth™ module, mobile communications hardware, and/or other hardware for communicating with other networks and/or devices. From this connection, communication may be facilitated between the vision-assist computing device 105a and other computing devices (such as user computing device 102, the vehicle computing device 105b, and/or the remote computing device 110).

The operating system logic 542 may include an operating system and/or other software for managing components of the vision-assist computing device 105a. As discussed above, the communication logic 144c may reside in the memory component 140b and may be configured to cause the processor 530 to receive environmental data, routing data, location, as well as data from the user, the user computing device 102, and/or the remote computing device 110 and determine a destination and/or route accordingly. Similarly, the command logic 144d may be utilized to provide commands for the user to reach the vehicle 108.

It should be understood that while the components in FIG. 5 are illustrated as residing within the vision-assist computing device 105a, this is merely an example. In some embodiments, one or more of the components may reside external to the vision-assist computing device 105a. It should also be understood that, while the vision-assist computing device 105a is illustrated as a single device, this is also merely an example. In some embodiments, the communication logic 144c and the command logic 144d may reside on different computing devices. As an example, one or more of the functionalities and/or components described herein may be provided by the user computing device 102 and/or other devices, which may be communicatively coupled to the vision-assist computing device 105a. These computing devices may also include hardware and/or software (such as that depicted in FIG. 5) for performing the functionality described herein.

Additionally, while the vision-assist computing device 105a is illustrated with the communication logic 144c and the command logic 144d as separate logical components, this is also an example. In some embodiments, a single piece of logic may cause the vision-assist computing device 105a to provide the described functionality.

As illustrated above, various embodiments for directing a user to a vehicle 108 are disclosed. Embodiments described herein, embodiments may provide a vision impaired user with the ability to easily locate and enter a vehicle such as a taxi, ride-sharing service vehicle, and/or other vehicle. Additionally, embodiments may detect obstacles and reroute the user based on changes to environment and/or position of the vehicle 108.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for directing a user to a vehicle 108 It should also be understood that these embodiments are merely exemplary and are not intended to limit the scope of this disclosure.

What is claimed is:

1. A system for directing a vision-impaired user to a vehicle comprising:

a vision-assist apparatus that includes an output device for communicating data that is perceptible by the vision-impaired user and a computing device that is coupled to the output device, the computing device comprising a processor and memory that stores logic that, when executed by the processor, causes the vision-assist apparatus to perform at least the following:

receive an indication that the vehicle has arrived at a predetermined location, wherein the vehicle includes a vehicle computing device;

receive, from the vehicle computing device, a specific real-time position of the vehicle in the predetermined location;

determine a route to direct the vision-impaired user to the specific real-time position; and provide instructions to traverse the route to the specific real-time position for output by the output device.

2. The system of claim 1, wherein the logic further causes the system to perform at least the following:

determine an obstacle on the route; and reroute the vision-impaired user to avoid the obstacle and direct the vision-impaired user to the specific real-time position.

3. The system of claim 1, wherein the logic further causes the system to perform at least the following:

receive a communication from the vehicle computing device indicating a change of position of the vehicle; and reroute the vision-impaired user to accommodate the change of position and reach the vehicle.

4. The system of claim 1, further comprising a user computing device, wherein the user computing device sends the request for the vehicle to the predetermined location.

5. The system of claim 1, wherein the logic further causes the system to perform at least the following:

determine whether the vision-impaired user can reach the vehicle; and in response to determining that the vision-impaired user cannot reach the vehicle, send a request for the vehicle to change position.

6. The system of claim 1, wherein the output device includes at least one of the following: a tactile output device and a speaker.

7. The system of claim 1, further comprising a camera, wherein the camera receives environmental data along the route and provides an additional instruction, based on the environmental data.

8. A method for directing a vision-impaired user to a vehicle comprising:

receiving a request for the vehicle to arrive at a predetermined location, wherein the vehicle includes a vehicle computing device;

receiving an indication that the vehicle has arrived at the predetermined location;

receiving a specific real-time position of the vehicle in the predetermined location;

determining a route to direct the vision-impaired user to the specific real-time position;

determining an obstacle along the route;

creating a revised route to avoid the obstacle; and providing instructions to traverse the revised route to the specific real-time position.

9. The method of claim 8, further comprising sending the request for the vehicle to the predetermined location.

10. The method of claim 8, further comprising:

receiving a communication indicating a change of position for the vehicle; and rerouting the vision-impaired user to accommodate the change of position and reach the vehicle.

11. The method of claim 8, further comprising:

determining whether the vision-impaired user can reach the vehicle along the route; and in response to determining that the vision-impaired user cannot reach the vehicle, sending a request for the vehicle to change position.

12. The method of claim 8, further comprising:

receiving environmental data along the route; and providing an additional instruction, based on the environmental data.

13. The method of claim 8, further comprising sending a location of the vision-impaired user to the vehicle.

14. The method of claim 8, further comprising providing additional instructions for the vision-impaired user to enter the vehicle.

15. A system for directing a vision-impaired user to a vehicle comprising:

an output device for communicating data that is perceptible by a vision impaired user; and a computing device that is coupled to the output device, the computing device comprising a processor and memory that stores logic that, when executed by the processor, causes the system to perform at least the following:

receive an indication that the vehicle has arrived at a predetermined location;

receive a specific real-time position of the vehicle in the predetermined location from a vehicle computing device of the vehicle;

determine a route to direct the vision-impaired user to the specific real-time position;

provide a first instruction for the vision-impaired user to traverse the route to the specific real-time position for output by the output device;

determine a change of position of the vehicle; and provide a second instruction for the vision-impaired user to reach the vehicle, according to the change of position.

16. The vehicle of claim 15, wherein the logic further causes the system to perform at least the following:

determine an obstacle on the route; and reroute the vision-impaired user to avoid the obstacle and direct the vision-impaired user to the vehicle.

17. The vehicle of claim 15, wherein the logic further causes the system to perform at least the following:

determine whether the vision-impaired user can reach the vehicle; and in response to determining that the vision-impaired user cannot reach the vehicle, send a request for the vehicle to change position.

18. The vehicle of claim 15, wherein the output device includes at least one of the following: a tactile output device and a speaker.

19. The vehicle of claim 15, further comprising a camera, wherein the camera receives environmental data along the route and provides an additional instruction, based on the environmental data.

20. The vehicle of claim 15, wherein the logic further causes the system to provide instructions for the vision-impaired user to enter the vehicle.

* * * * *

UNITED STATES PATENT AND TRADEMARK OFFICE
CERTIFICATE OF CORRECTION

PATENT NO. : 9,829,322 B2
APPLICATION NO. : 15/060015
DATED : November 28, 2017
INVENTOR(S) : Christopher P. Lee Page 1 of 1

It is certified that error appears in the above-identified patent and that said Letters Patent is hereby corrected as shown below:

In the Specification

In Column 4, Line 21, after "**144*f***", insert --.--.

Signed and Sealed this
Thirteenth Day of February, 2018

Andrei Iancu
*Director of the United States Patent and Trademark Office*